United States Patent [19]

Marion

[11] Patent Number: 4,830,619

[45] Date of Patent: May 16, 1989

[54] TABLE SETTING DISPLAY GUIDE

[75] Inventor: Elliott Marion, Jericho, N.Y.

[73] Assignee: The Conde Nast Publications Inc., New York, N.Y.

[21] Appl. No.: 148,798

[22] Filed: Jan. 27, 1988

[51] Int. Cl.⁴ ............................................. G09B 1/34
[52] U.S. Cl. .................... 434/382; 434/78; 434/79; 434/80; 446/147; 281/15.1
[58] Field of Search ................. 434/433, 365, 80, 78, 434/178, 382, 79, 318; 281/3 R, 22; 446/147; 273/286, 148 R

[56] References Cited

U.S. PATENT DOCUMENTS

| | | |
|---|---|---|
| 1,521,491 | 12/1924 | Walker . |
| 1,670,159 | 5/1928 | Maxon . |
| 1,832,750 | 11/1931 | Stephens ............................. 434/78 |
| 2,167,131 | 7/1939 | Weidenborner . |
| 2,244,590 | 6/1941 | Vonderheid . |
| 2,294,131 | 8/1942 | Raymond . |
| 2,481,672 | 9/1949 | Kanaske . |
| 3,559,306 | 2/1971 | Winans ................................. 434/79 |
| 3,750,309 | 8/1973 | Tovar . |
| 4,245,401 | 1/1981 | Riehle . |
| 4,250,642 | 2/1981 | Riehle . |

OTHER PUBLICATIONS

"My New Better Homes & Gardens Cook Book", Chap. XV, p. 3 (c. 1961).

Primary Examiner—Edward M. Coven
Assistant Examiner—Valerie Szczepanik
Attorney, Agent, or Firm—Blum Kaplan

[57] ABSTRACT

A table setting display guide for coordinating table settings and dinnerware plate patterns. The table setting display guide includes a first page which illustrates at least one table setting having an opening at the position where a dinnerware plate would be set. A second page is provided which illustrates a plurality of dinnerware plate patterns, which patterns are sized to correspond to the size of the opening in the first page. The opening in the first page is selectively positionable on the second page to permit viewing of each dinnerware plate pattern in conjunction with the table setting.

8 Claims, 4 Drawing Sheets

TABLE SETTING DISPLAY GUIDE

BACKGROUND OF THE INVENTION

The present invention is directed generally to a table setting display guide and, in particular, to a table setting display guide whereby a user can select a desired dinnerware plate pattern to be used in conjunction with a selected table setting.

There are numerous dinnerware plate or china manufacturers which manufacture and offer for sale a plurality of different dinnerware plate patterns. Similarly, table settings which include selected tablecloths, napkins, silverware, stemware, glasses and the like come in various arrangements. Table settings may, for example, be provided in formal, informal, traditional, contemporary, country and transitional layouts.

A consumer, in deciding which table setting layout best suits such consumer's taste and desire usually first selects one of the table setting layouts. After such table setting layout is selected, the consumer faces the difficult choice of selecting an appropriate dinnerware plate pattern which both compliments the table setting layout selected and meets the consumer's taste an desire.

Heretofore, it has proven difficult for manufacturers of table settings and manufacturers of dinnerware plate patterns to provide a convenient and accessible means whereby a consumer could make an appropriate selection from among the numerous table settings and dinnerware plate patterns provided.

Accordingly, it is desired to provide a table setting display guide which allows a consumer to readily and conveniently match a selected table setting to one of a plurality of dinnerware plate patterns.

SUMMARY OF THE INVENTION

Generally speaking, in accordance with the present invention, a table setting display guide for coordinating a table setting with a dinnerware plate pattern is provided. The table setting display guide includes a first page which depicts at least one table setting. The table setting includes an opening at the position where the dinnerware plate in the table setting would normally be set. The table setting display guide also includes a second page which depicts a plurality of dinnerware plate patterns, which dinnerware plate patterns are sized to correspond to the size of the opening in the first page. The opening in the first page is selectively positionable on the second page to permit viewing of each dinnerware plate pattern through the opening in conjunction with the at least one table setting.

With the present invention, a consumer can readily and conveniently determine the dinnerware plate pattern which meets the needs, desire and taste of such consumer.

In a preferred embodiment, the first page includes several table settings, such as a formal setting and an informal setting on the front of the page, and a contemporary setting and a country setting on the back of the page. Each setting includes an opening at the position where the dinnerware plate would be set. The consumer first selects the table setting desired and then views the various dinnerware plate patterns through the opening in the table setting selected to assist in selecting a desired dinnerware plate pattern.

It is preferable that the table setting display guide of the present invention be provided in a magazine. In such a format, the magazine would include several second pages, each of which depict a plurality of dinnerware plate patterns. The first page of the display guide would be releaseably secured in the magazine such as through the use of perforations. When a consumer purchases the magazine, such consumer can readily remove the first page, select the table setting desired illustrated therein and then position the opening in such table setting over the plurality of dinnerware plate patterns to permit viewing thereof in conjunction with the selected table setting.

Accordingly, it is desired to provide a table setting display guide.

Another object of the present invention is to provide a table setting display guide which permits a consumer to conveniently select from a plurality of dinnerware plate patterns in conjunction with a selected table setting.

A further object of the present invention is to provide a table setting display guide which permits a consumer to readily select a desired dinnerware plate pattern with respect to a selected tableware setting which can be incorporated into a magazine.

A still further object of the present invention is to provide a table setting display guide which is easy and convenient to use and which is inexpensive to construct and print.

Still other objects and advantages of the invention will in part be obvious from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
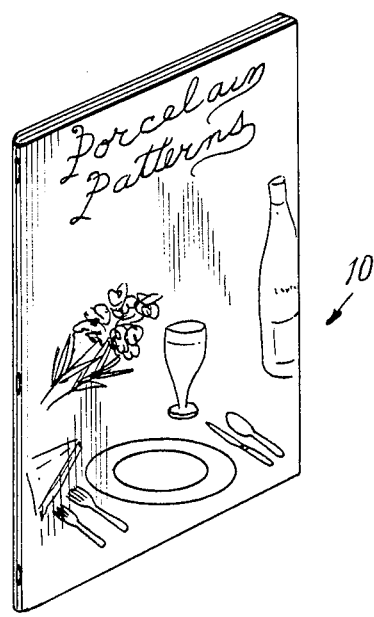
FIG. 1 is a perspective view of a magazine which incorporates a table setting display guide constructed in accordance with a preferred embodiment of the present invention.

Reference is first made to FIG. 1 of the drawings which depicts a magazine, generally indicated at 10, comprised of a plurality of pages and which includes several pages which form the table setting display guide in accordance with the present invention.

Figure 2:
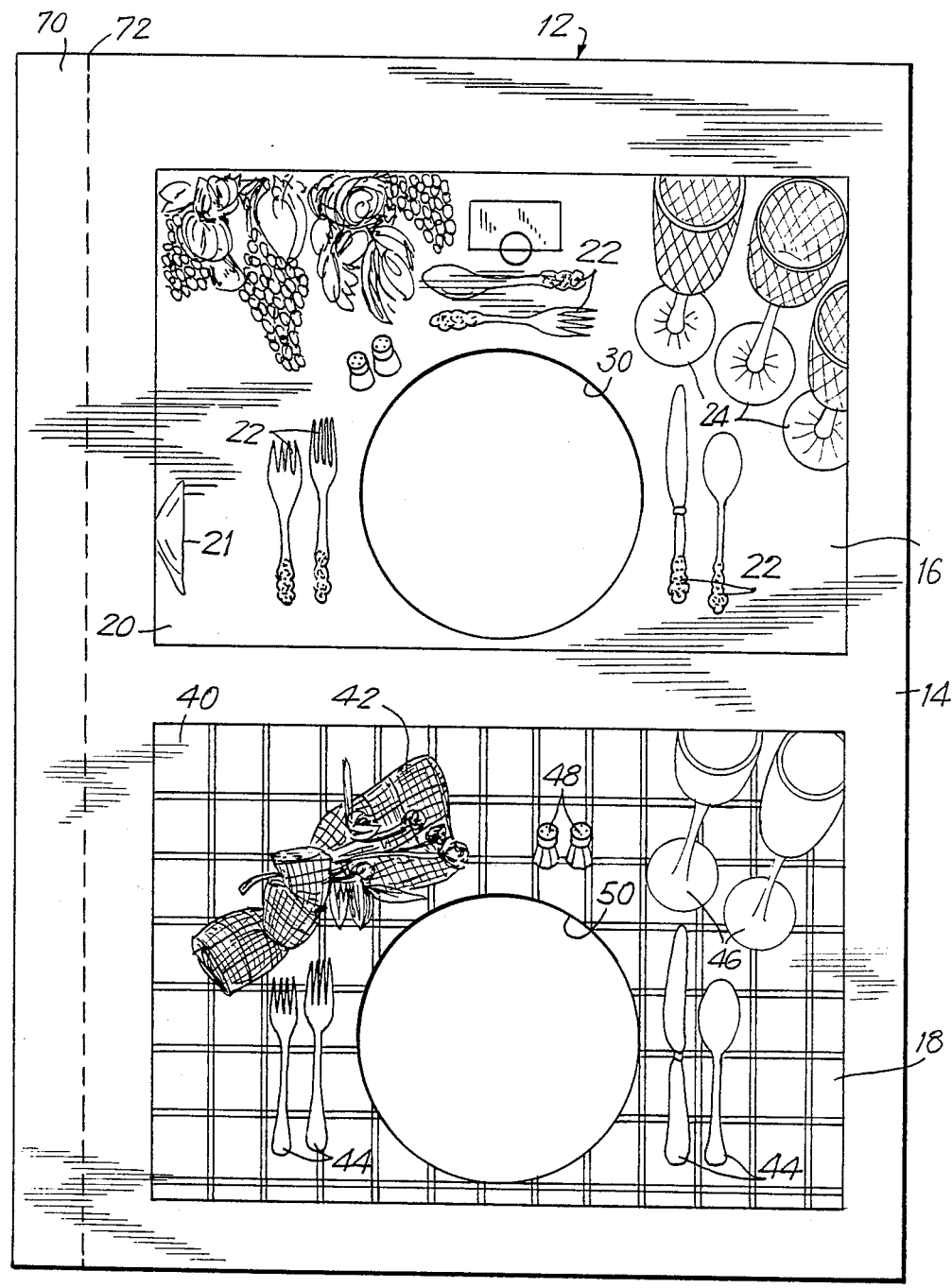
FIG. 2 is a top plan view of one page from the magazine depicted in FIG. 1 which shows two table setting patterns thereon.
Figure 3:
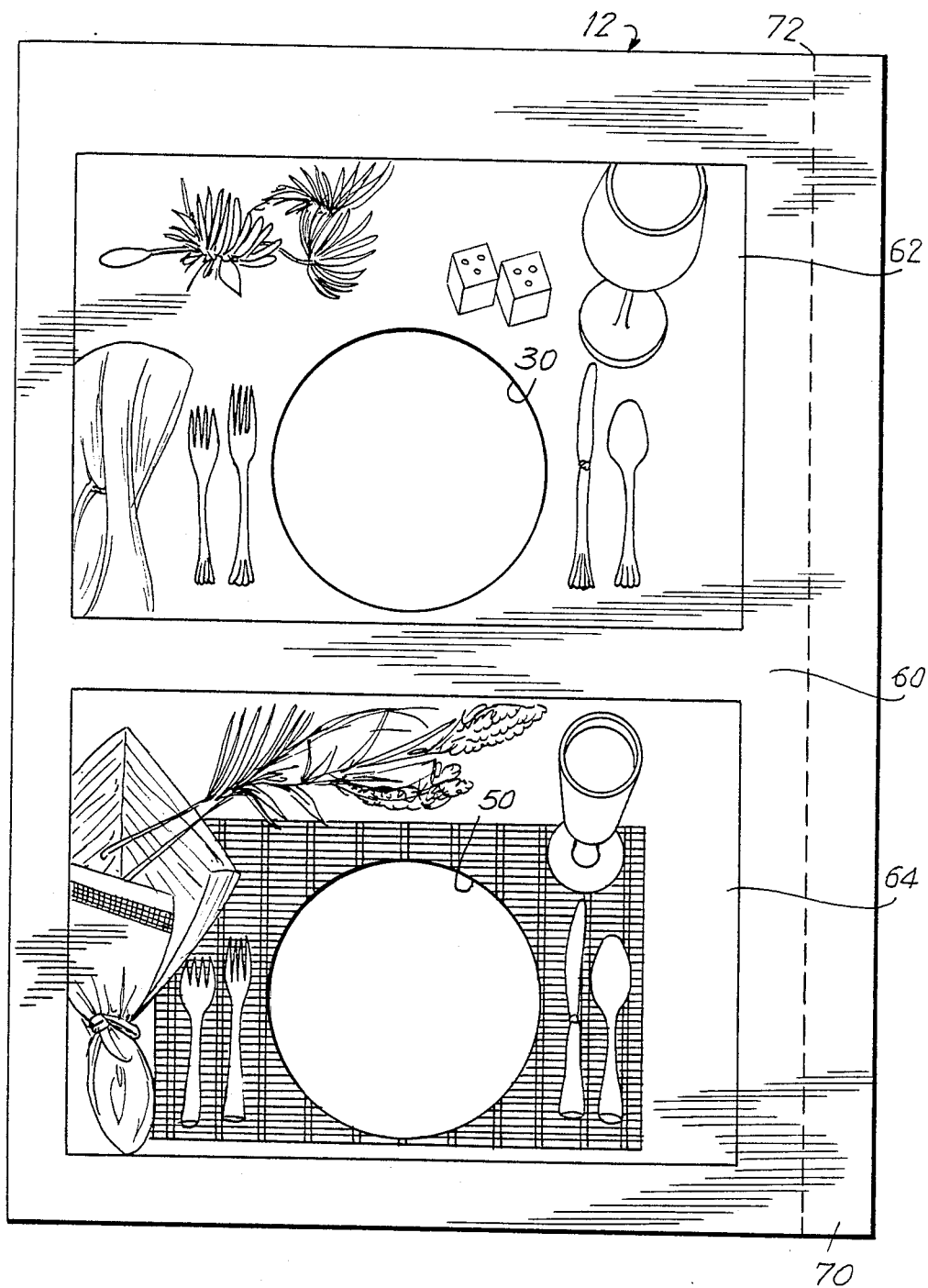
FIG. 3 is a bottom plan view of the page depicted in FIG. 2 showing two additional table setting patterns thereon.

Referring now additionally to FIGS. 2 through 6 of the drawings, it is noted that FIGS. 2 and 3 depict the front and back of one of the pages, shown as 12, from magazine 10. Page 12 includes a front surface 14 which illustrates two table settings 16 and 18. Table setting 16 includes, for example, a tablecloth 20, a napkin 21, silverware 22, glasses or stemware 24, salt and pepper shakers and a floral arrangement. At the position where a dinnerware plate would normally be set, i.e., between the dinner fork and knife of silverware 22, illustrated table setting 16 includes a circular opening or cut-out portion 30. As depicted, table setting 16 might comprise a "formal" table setting.

Table setting 18 depicts a more "informal" table setting with a tablecloth 40, a napkin 42, silverware 44, glasses or stemware 46 and salt and pepper shakers 48. At the position where a dinnerware plate would normally be positioned in table setting 18, a circular opening 50 is provided.

As mentioned above, FIG. 3 depicts the back of page 12 depicted in FIG. 2 which is designated as 60. Back 60 of page 12 includes two table settings 62 and 64 which include many of the same types of elements as the table settings depicted in FIG. 2. As FIG. 3 depicts the back of page 12, table setting 62 also includes the opening 30 at the position where the dinnerware plate would normally be situated. Similarly, table setting 64 includes the opening 50 at the position where the dinnerware plate would normally be set. Table setting 62, because of the style of elements used, might be referred to as a "contemporary" table setting, and table setting 64 might be referred to as a "country" table setting.

Page 12 depicted in FIGS. 2 and 3 would normally be bound in magazine 10 when published along a binding edge 70. A weakened line of perforations 72 is provided essentially parallel to the edge of binding edge 70 to permit easy removal of page 12 from magazine 10.

Figure 4:
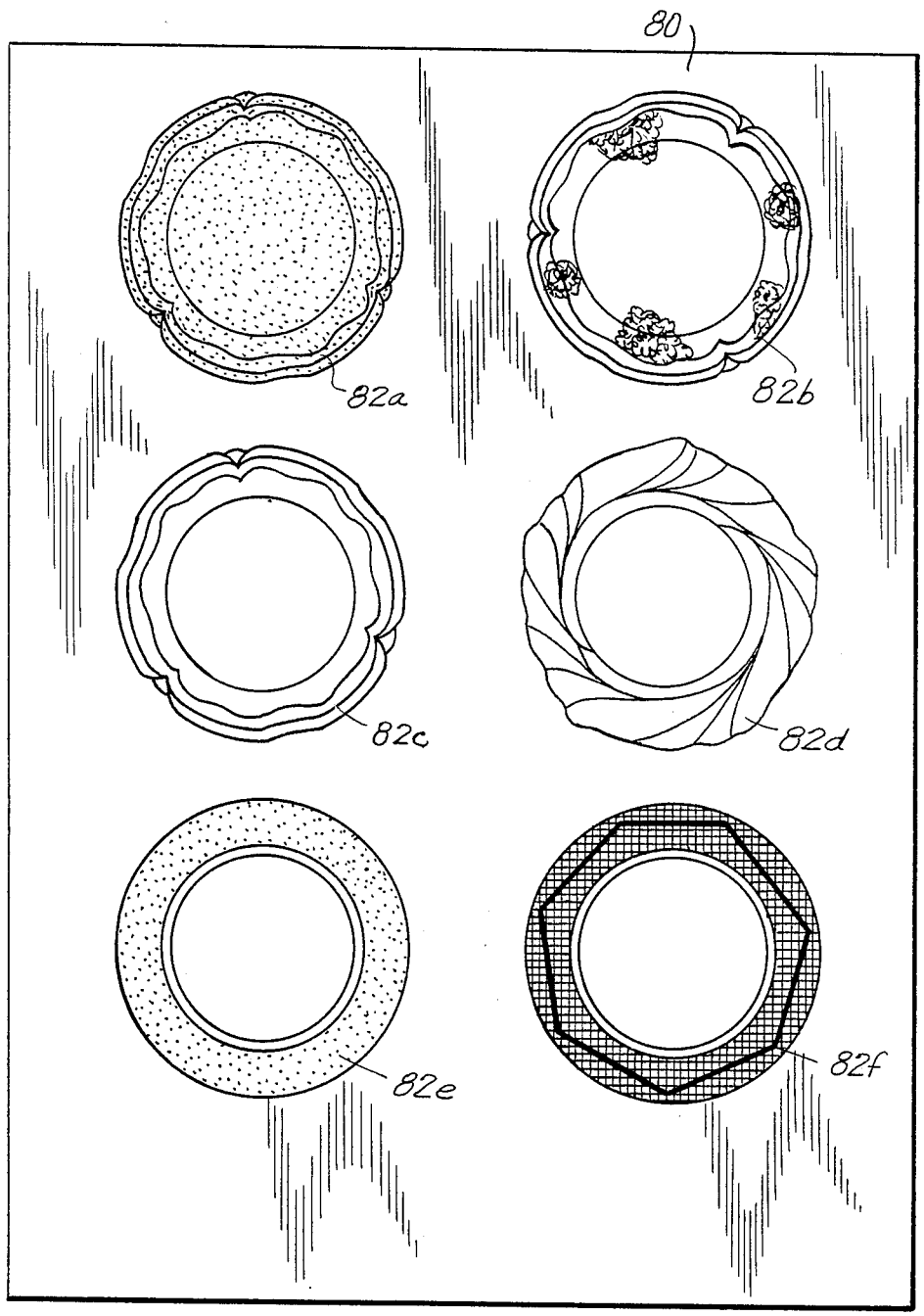
FIG. 4 is a top plan view of a second page from the magazine depicted in FIG. 1 which illustrates a plurality of dinnerware plate patterns.

FIG. 4 depicts another page 80 which is bound in magazine 10. Page 80 illustrates six different dinnerware plate patterns 82a through 82f. The illustrated dinnerware plates 82a through 82f are sized to conform to the size of openings 30 and 50 in page 10 depicted in FIGS. 2 and 3. It is noted that several pages like page 80 which depict dinnerware plate patterns may be provided in magazine 10.

In order to use the table setting display guide of the present invention, a user would first remove page 12 from magazine 10 along perforations 72. The user then selects one of the four table settings depicted on the front 14 and back 60 of page 12 which suits the user's individual taste and desire. The user would then position the appropriate opening 30 or 50 over selected dinnerware plate patterns 82a through 82f in order to permit viewing by the user of the selected tableware setting with the various dinnerware plate patterns in the proper position. In this manner, the user can select the table setting and dinnerware plate combination which is desirable.

Figure 5:
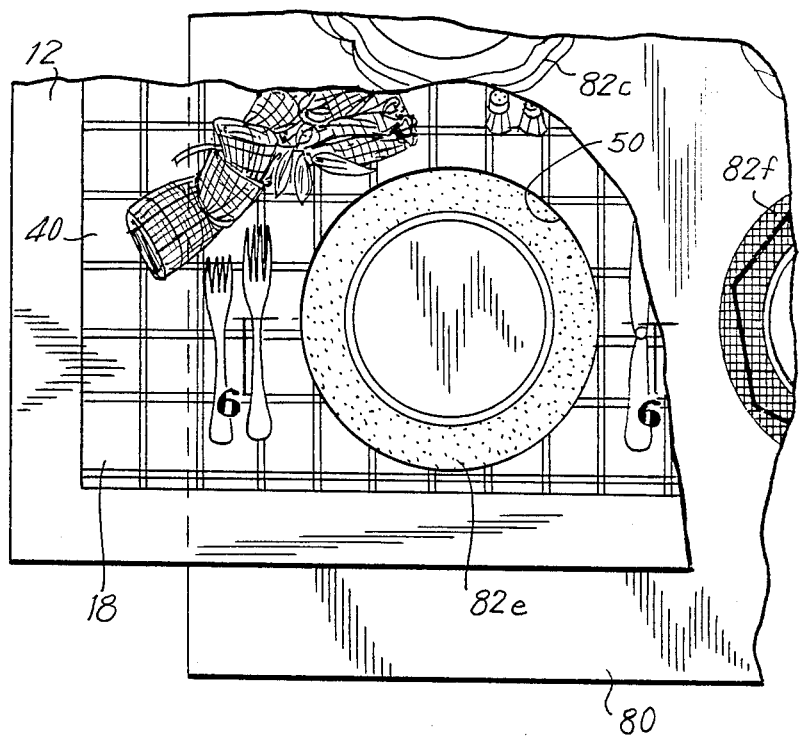
FIG. 5 is a partial top plan view showing the page depicted in FIG. 2 being placed over and used in conjunction with the second page depicted in FIG. 4 in accordance with the present invention.
Figure 6:
FIG. 6 is an enlarged sectional view taken along line 6—6 of FIG. 5.

FIGS. 5 and 6 depict the placement of opening 50 in tableware setting 18 on front 14 of page 12 over dinnerware plate pattern 82e on page 80 in accordance with the present invention. It can be seen that with such placement, a complete table setting is presented, and a user can readily determine whether such complete table setting is to the user's liking.

It is noted that several pages of table settings such as page 12 may be provided in magazine 10. For example, a second page of table settings might depict a traditional table setting and a contemporary setting on one side and a country setting and a transitional setting on the other side of the page. A plurality of pages such as page 80 which includes several dinnerware plate patterns thereon may be provided in magazine 10. For example, each separate dinnerware plate or china manufacturer may desire to place its dinnerware plate patterns on separate pages in the magazine, and the publisher of the magazine could sell such space as advertising space.

The present invention can be used, for example, in bridal magazines to permit a future bride and groom to select appropriate table settings and dinnerware plate patterns to be used in conjunction therewith. The selected tableware settings and dinnerware plate patterns can then be registered with appropriate bridal registries so that those desiring to provide gifts to the bride and groom will know which patterns have been selected.

The present invention provides a convenient and easy means whereby a user can readily coordinate table settings and dinnerware plate patterns. The invention can be readily incorporated into a magazine and is inexpensive and easy to manufacture and print. The invention meets each of the objects and advantages referred to above and described herein.

It will thus be seen that the objects set forth above, among those made apparent from the preceding description, are efficiently attained and, since certain changes may be made in the above article without departing form the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A table setting display guide for coordinating a table setting with a dinnerware plate pattern comprising a first page illustrating at least one table setting having a first opening therein at the position where a dinnerware plate would be set, and a second page having a plurality of dinnerware plate patterns depicted thereon, said dinnerware plate patterns being sized to correspond to the size of said opening in said first age, said opening in said first page being selectively positionable over each dinnerware plate pattern on said second page to permit viewing of each said dinnerware plate pattern in conjunction with said at least one table setting, said first page including a front side and a back side, said at least one table setting being illustrated on said front side, and a second table setting illustrated on said back side at a position where said opening appears where a dinnerware plate in said second table setting would be set.

2. The table setting display guide as claimed in claim 1, wherein said first and second pages are bound as part of a magazine, said first page including removal means for permitting removal of said first page from said magazine.

3. The table setting display guide as claimed in claim 2, wherein said removal means is a weakened line of perforations.

4. The table setting display guide as claimed in claim 1, wherein said opening is circular.

5. The table setting display guide as claimed in claim 1, wherein said front side of said first page includes a third table setting illustration having a second opening at the position where a dinnerware plate would be set, said back side of said first page including a fourth table setting illustration at a position where said second opening appears where a dinnerware plate would be set.

6. The table setting display guide as claimed in claim 5, wherein said first and second openings are circular and of substantially the same diameter.

7. The table setting display guide as claimed in claim 6, wherein said first and second pages are bound as part of a magazine, said first page including removal means for permitting removal of said first page from said magazine.

8. The table setting display guide as claimed in claim 7, wherein said removal means is a weakened line of perforations.

* * * * *